(12) United States Patent
Eimann et al.

(10) Patent No.: US 12,011,082 B2
(45) Date of Patent: *Jun. 18, 2024

(54) MOLD INSERT AND METHOD OF MAKING A MOLD INSERT

(71) Applicant: The Procter & Gamble Company, Cincinnati, OH (US)

(72) Inventors: Klaus Eimann, Zellingen (DE); Gerald Görich, Weiterstadt (DE)

(73) Assignee: The Procter & Gamble Company, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/140,922

(22) Filed: Apr. 28, 2023

(65) Prior Publication Data
US 2023/0255343 A1 Aug. 17, 2023

Related U.S. Application Data

(60) Continuation of application No. 17/547,337, filed on Dec. 10, 2021, now Pat. No. 11,666,136, which is a
(Continued)

(30) Foreign Application Priority Data

Jun. 18, 2018 (EP) ..................................... 18178353

(51) Int. Cl.
*A46B 9/04* (2006.01)
*A46B 1/00* (2006.01)
(Continued)

(52) U.S. Cl.
CPC .................. *A46B 9/04* (2013.01); *A46B 1/00* (2013.01); *A46B 3/00* (2013.01); *A46B 3/005* (2013.01);
(Continued)

(58) Field of Classification Search
CPC .... A46B 9/04; A46B 3/12; A46B 3/00; A46B 3/005; A46B 3/04; A46B 1/00;
(Continued)

(56) References Cited

U.S. PATENT DOCUMENTS 3,173,177 A 3/1965 Rybka
3,302,230 A 2/1967 Ake
(Continued)

FOREIGN PATENT DOCUMENTS

CA 670147 A 9/1963
CN 101076273 A 11/2007
(Continued)

OTHER PUBLICATIONS

All Office Actions, U.S. Appl. No. 16/131,493, filed Sep. 14, 2018.
(Continued)

*Primary Examiner* — Nahida Sultana
*Assistant Examiner* — Mohamed K Ahmed Ali
(74) *Attorney, Agent, or Firm* — Gregory S. Darley-Emerson

(57) ABSTRACT

A mold insert and an injection-molding machine including the mold insert. The mold insert has at least one filament cavity and a stack of at least a first and second insert plates, wherein the first plate has a front face that closely abuts a front face of the second insert plate. A portion of the a filament cavity is provided in at least one of the front faces of the first and second insert plates such that the filament cavity is open at a top surface of the mold insert but does not extend to a bottom surface of the mold insert. A venting cavity is provided in the same front face of the insert plate in which the portion of the at least one filament cavity is provided.

15 Claims, 5 Drawing Sheets

Related U.S. Application Data division of application No. 16/131,823, filed on Sep. 14, 2018, now Pat. No. 11,425,992.

(51) Int. Cl.

| | |
|---|---|
| *A46B 3/00* | (2006.01) |
| *A46B 3/04* | (2006.01) |
| *A46B 3/12* | (2006.01) |
| *A46D 1/00* | (2006.01) |
| *A46D 3/00* | (2006.01) |
| *B29C 33/30* | (2006.01) |
| *B29C 45/00* | (2006.01) |
| *B29C 45/14* | (2006.01) |
| *B29C 45/26* | (2006.01) |
| *B29C 45/34* | (2006.01) |
| *B29C 45/56* | (2006.01) |
| *B29L 31/42* | (2006.01) |

(52) U.S. Cl.
CPC ............ *A46B 3/04* (2013.01); *A46B 3/12* (2013.01); *A46D 1/0207* (2013.01); *A46D 1/0238* (2013.01); *A46D 1/0269* (2013.01); *A46D 1/0276* (2013.01); *A46D 3/00* (2013.01); *A46D 3/005* (2013.01); *B29C 33/301* (2013.01); *B29C 45/0055* (2013.01); *B29C 45/14385* (2013.01); *B29C 45/2626* (2013.01); *B29C 45/34* (2013.01); *B29C 45/561* (2013.01); *A46B 2200/1066* (2013.01); *B29C 45/2673* (2013.01); *B29L 2031/425* (2013.01)

(58) Field of Classification Search
CPC ............ A46D 3/005; B29C 45/14385; B29C 45/561; B29C 45/34; B29C 45/2626; B29C 45/2673; B29L 2031/42
See application file for complete search history.

(56) References Cited

U.S. PATENT DOCUMENTS

| | | |
|---|---|---|
| 3,357,058 A | 12/1967 | Kutik |
| 3,467,990 A | 9/1969 | Kutik |
| 3,847,532 A | 11/1974 | Bischoff |
| 3,996,330 A | 12/1976 | Jones et al. |
| 4,422,986 A | 12/1983 | Cole |
| 5,283,921 A | 2/1994 | Ng |
| 5,636,405 A | 6/1997 | Stone |
| 5,689,850 A | 11/1997 | Shekalim |
| 7,294,297 B2 | 11/2007 | Weihrauch |
| 8,545,203 B2 | 10/2013 | Maeaettae |
| 8,915,552 B2 | 12/2014 | Birk |
| 9,210,995 B2 | 12/2015 | Su |
| 10,010,167 B2 | 7/2018 | Motahedy |
| 10,245,720 B2 | 4/2019 | Ptak et al. |
| 10,258,139 B2 | 4/2019 | Trasforini |
| 10,980,336 B2 | 4/2021 | Görich et al. |
| 11,425,992 B2 | 8/2022 | Eimann et al. |
| 11,666,136 B2 | 6/2023 | Eimann et al. |
| 2003/0163884 A1 | 9/2003 | Weihrauch |
| 2003/0221273 A1 | 12/2003 | Mark |
| 2005/0006819 A1 | 1/2005 | Weihrauch |
| 2005/0172439 A1 | 8/2005 | Weihrauch |
| 2008/0315669 A1 | 12/2008 | Kwon et al. |
| 2009/0083925 A1 | 4/2009 | Mathiez |
| 2009/0326415 A1 | 12/2009 | Lim |
| 2011/0239391 A1 | 10/2011 | Driesen et al. |
| 2012/0041337 A1 | 2/2012 | Ferguson |
| 2017/0065071 A1 | 3/2017 | Fritsch et al. |
| 2018/0317640 A1 | 11/2018 | Schär et al. |
| 2019/0090623 A1 | 3/2019 | Görich et al. |
| 2019/0381710 A1 | 12/2019 | Eimann et al. |
| 2021/0204683 A1 | 7/2021 | Görich et al. |
| 2022/0095777 A1 | 3/2022 | Eimann et al. |

FOREIGN PATENT DOCUMENTS

| | | |
|---|---|---|
| CN | 203776358 U | 8/2014 |
| DE | 2728672 A1 | 1/1979 |
| DE | 19925568 A1 | 12/2000 |
| EP | 0295900 A2 | 12/1988 |
| EP | 1785056 A1 | 5/2007 |
| FR | 2968907 A1 | 6/2012 |
| GB | 868957 A | 5/1961 |
| GB | 1411340 A | 10/1975 |
| WO | 9857570 A1 | 12/1998 |
| WO | 2008135953 A1 | 11/2008 |

OTHER PUBLICATIONS

All Office Actions, U.S. Appl. No. 16/131,823, filed Sep. 14, 2018.
All Office Actions, U.S. Appl. No. 17/193,145, filed Mar. 5, 2021.
All Office Actions; U.S. Appl. No. 17/547,337, filed Dec. 10, 2021.
EP Search Report and Written Opinion for EP18178353 dated Oct. 19, 2018, 7 pages.
PCT Search Report and Written Opinion for PCT/US2018/049439 dated Dec. 3, 2018, 11 pages.

MOLD INSERT AND METHOD OF MAKING A MOLD INSERT

FIELD OF THE INVENTION

The present disclosure is concerned with a method of manufacturing a mold insert that comprises at least two metal plates and it is concerned with a mold insert comprising at least two metal plates closely abutting each other to form at least one filament cavity.

BACKGROUND OF THE INVENTION

It is generally known that a unitary brush head comprising a base and filaments extending from the base can be manufactured by injecting molten plastic material into a cavity defining the base and the filaments with a high pressure and applying a holding pressure for a certain time. In order to define base and filaments of a unitary brush head in the mold tool, a mold insert is used. It is known that such a mold insert can be made from a plurality of stacked metal plates comprising recesses that are open on a top surface of the metal plates and that taper towards a lower end to define the filaments of the unitary brush head. Patent specification GB 868 957 generally describes such a stacked mold insert.

Simulations and experiments have shown that long filaments with fine tips represent an issue for this technology, i.e. the fine structures cannot be filled with the molten plastic materials as the friction between the molten plastic material and the mold walls defining the filaments is high and causes freezing of the molten plastic such that the molten plastic completely solidifies before the fine filament structures are filled.

It is now described in a co-pending patent application by the same applicant that filaments having a length suitable for, e.g., a toothbrush and having a small filament tip that cannot be made by the known plastic injection molding process can be manufactured by injection compression molding, where the molten plastic material is injected into the mold cavity at a pressure that is lower than the pressure used for regular injection molding and then a punching tool is immersed into the injected plastic to apply a compression pressure onto the molten plastic filling the cavity defining the base of the unitary brush head, which compression pressure is so high that the molten plastic is pushed into the filament cavities and fills those up to the fine tips.

It is an object of the present disclosure to provide a method of manufacturing a mold insert for defining the filament cavities that can be used in the mentioned injection compression molding process of making a unitary brush head and it is an object of the present disclosure to provide the mold insert suitable for this task.

SUMMARY OF THE INVENTION

Of one aspect a method of manufacturing a mold insert for injection molding, in particular injection compression molding, of a unitary brush head having a base and filaments extending therefrom is provided that comprises the steps of:
providing at least a first insert plate and a second insert plate that each have at least one front face;
forming a portion of at least one filament cavity into at least one of the front faces of the first or second insert plate such that the filament cavity is open at a top surface of the insert plate but does not extend through to a bottom surface of the insert plate;
forming a venting cavity into the same front face into which the filament cavity is formed, where the venting cavity is formed with a depth such that the venting cavity is in air conducting connection with the blind-hole end of the filament cavity; and
bringing the front faces of the first and second insert plates into close abutment so that at least one filament cavity is formed.

Of one aspect a mold insert is provided that defines at least one filament cavity and comprises a stack of at least a first insert plate and a second insert plate, wherein the first plate has a front face that closely abuts a front face of the second insert plate, at least a portion of the at least one filament cavity is provided in at least one of the front faces of the first insert plate or second insert plate such that the filament cavity is open at a top surface of the mold insert but does not extend to a bottom surface of the mold insert, a venting cavity is provided in the same front face of the insert plate in which the portion of the at least one filament cavity is provided, which venting cavity is in air-conducting connection with the blind-hole end of the filament cavity, and the venting cavity has a depth in a direction essentially perpendicular to the front face of the respective first or second insert plate.

In one aspect, an injection compression molding machine is provided that comprises a mold insert as discussed herein.

BRIEF DESCRIPTION OF THE DRAWINGS

The present disclosure will be further elucidated by a detailed description of example embodiments of methods as proposed and of mold inserts as proposed, where in the description reference is made to figures. In the figures FIG. 1 schematic depiction of a toothbrush comprising a unitary brush head of the present description.

DETAILED DESCRIPTION OF THE INVENTION

Figure 1:
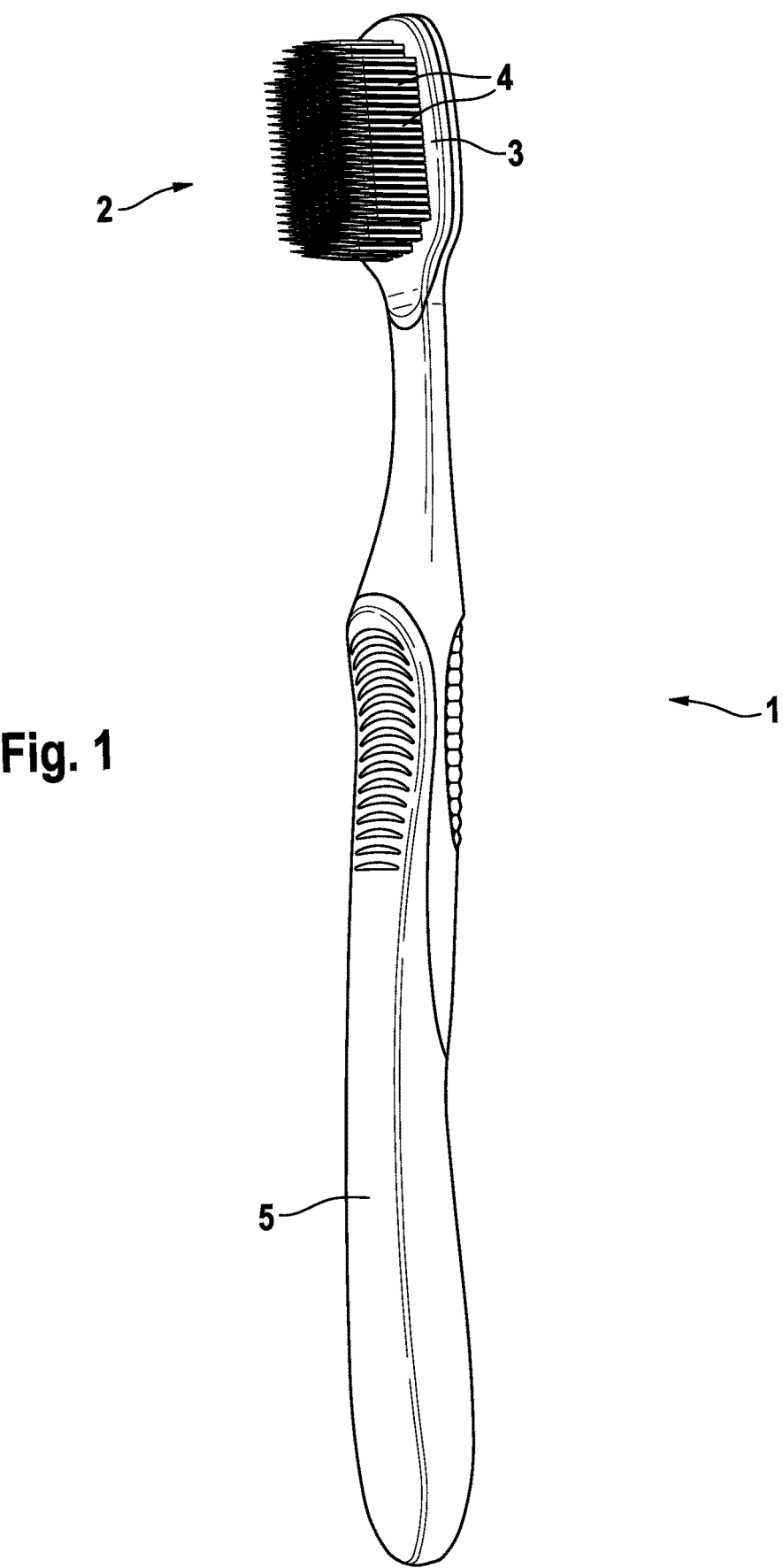

In order to provide molding machines for manufacturing unitary brush heads having at least one filament with a small sized filament tip diameter in the range of between 5 μm and 40 μm, a mold insert is needed that provides the respective filament cavity. The filament cavity needs to be de-aired when the molten plastic is pushed into the filament cavities so that the filament cavity can be filled up to its tip. The ventilation must be achieved in a manner that the air can leave the filament cavity but where it is essentially inhibited that also molten plastic material leaves the filament cavity despite the high pressure that is used to fill the filament cavities. In order to achieve this, a venting cavity is provided that is in air-conducting connection with the blind-hole end of the filament cavity, but which venting cavity itself is so thin that the molten plastic can essentially not enter into the venting cavity as the pressure for entering into the venting cavity becomes too high and the molten plastic stops its flow and solidifies. Depending on the size of the filament tip, on the used material (and in particular on the viscosity of the chosen plastic injection material) and on the pressure used to push the molten plastic material into the filament cavity, the venting cavity has a thickness in the range of between 1 μm and 20 μm, in particular in the range of between 2 μm and 10 μm, and further in particular in the range of 3 μm and 6 μm, including all values in these ranges such as 4 μm and 5 μm.

In order to achieve the provision of the thin venting cavity and/or of the filament cavities, various technologies of material removal may be applied such as precise electro-chemical machining (PECM) or material ablation with a laser. Applying in particular ultra-short laser pulses having a pulse length in the range of one femtosecond to ten picoseconds is a technology that enable very controlled material ablation so that the thin venting channels can be formed with high precision.

Ultra-short pulsed laser ablation technology means ablation of material by application of ultra-short laser pulses in the femtosecond to ten picosecond range, where the material is essentially directly vaporized without generating any material melt and whereby thermal damage and melt accretions on the product are essentially reduced in comparison to, e.g. nanosecond or microsecond or millisecond pulsed laser ablation. Hence, ultra-short pulsed laser ablation technology provides high precision in surface quality, reproducibility, and high control of ablation depth. Ultra-fast pulsed laser ablation devices are available from various companies, e.g. the TruMicro devices from Trumpf GmbH & Co. KG, Ditzingen, Germany. The use of ultra-short pulsed laser technology for making of filament cavity and/or venting cavity shall not exclude that in addition other technologies are used as well, e.g. nanosecond or microsecond pulsed laser ablation, in order to benefit from a higher ablation rate (in particular for forming the filament cavity or a portion of the venting cavity that is not in direct contact with the blind-end hole of the filament cavity. It shall also not be excluded that other material removal technologies are applied, e.g. electrical discharge machining (EDM). E.g. a process of providing a depression in an insert plate that shall define at least a portion of a filament cavity may include a first step of relatively coarse but efficient (i.e. high ablation rate) material removal using an EDM technology and a second step of relatively precise laser ablation at a lower ablation rate.

The material from which the insert plates are made may be a chromium-containing ESU steel type such as 1.2083 ESU X40Cr14.

In some embodiments, the width of a portion of the venting cavity is much larger than the depth of the venting cavity. In operation, when the front faces of insert plates are pushed together with in particular high pressure to avoid that the insert plates move away under the high applied plastic injection molding pressure (or injection compression molding pressure), the material of the insert plates may deform and may thus deform into the venting cavity to a certain degree. In order to avoid such a filling of the venting cavity, the venting cavity may comprise one or several spacer elements that project from the bottom of the venting cavity and may have a height that coincides with the depth of the venting cavity, i.e. the front end of the spacer element or the front ends of the spacer elements lie on the same plane as the front face of the insert plate. While it shall not be excluded that the spacer elements may be made by material deposition technology (e.g. by a laser additive technology), it is in particular mentioned that the spacer elements are created by only removing material around the spacer elements to form the venting cavity. While the spacer elements may have any size and shape, they may in particular have a width in each of the two dimensions in which the venting cavity extends (not the depth dimension) that lies in the range of between 10 micrometer to 10 millimeter, in particular in the range of between 100 micrometer to 5 millimeter.

In the manufacturing of a unitary brush head, a mold insert (in following usually only named insert) may be used that is assembled from a vertical stack of at least two insert plates, where the filament cavity is defined by either one depression in a face side of one insert plate (and a structureless face side of the abutting other insert plate) or by two cooperating depressions in abutting face sides of the insert plates. This shall not exclude that a projection or several projections may be formed on at least one of the face sides, which projection or projections extend into the cavity formed by the depression to thereby shape the filament cavity. The term "vertical" here means that the filament cavity (filament cavities) is defined by abutting face sides of the insert plates instead of by through-holes (and potentially one blind end hole) in a horizontal stack of insert plates. Generally, the use of a horizontal stack of insert plates is not excluded for ICM-made unitary brush heads, but in the following, the present application focuses on a vertical stack of insert plates. The more insert plates are used, the more filament cavity "rows" can be defined. For a typical brush head size of between 1 cm and 3 cm in length and width direction and a typical filament distance of 1 mm, about eleven to thirty-one insert plates may be used. In the present document essentially planar insert plates are shown as one example and circular insert plates (or insert rings) are shown as a second example. This shall not be limiting and otherwise curved insert plates are contemplated as well. For planar insert plates, the filaments will be arranged in rows and for circular or ring-like insert plates, the filaments will be arranged in rings. For otherwise shaped insert plates, the filaments may be arranged on other lines (e.g. an ellipse or a wavy line). It is also contemplated that the insert plates have one curvature on one side and another curvature on the other side. Further, while the filaments shown in the present application all extend essentially perpendicular from the base surface, at least one or several or even all of the filaments may extend from the base at an angle different to about 90 degrees (and in particular, the angle and/or the direction of inclination may be different between two or more of these inclined filaments).

FIG. 1 is a schematic depiction of an example toothbrush 1 comprising a unitary brush head 2 having a base 3 and filaments 4 extending from the base 3 in a unitary manner and a handle 5 that is connected with the unitary brush head 2. In the shown embodiment, the handle extends underneath the base 3 so that the head portion of the toothbrush 1 is formed by the unitary brush head 1 on the front side (where the filaments are located) and a head portion of the handle 5. The handle 5 may in particular be connected with the unitary brush head 1 in an injection molding process, i.e. a process in which the unitary brush head is inserted into a mold cavity and the handle is then injection molded and connects with the unitary brush head by material adhesion/bonding (requiring respectively affinity between the materials chosen for the unitary brush head and the handle).

Figure 2:
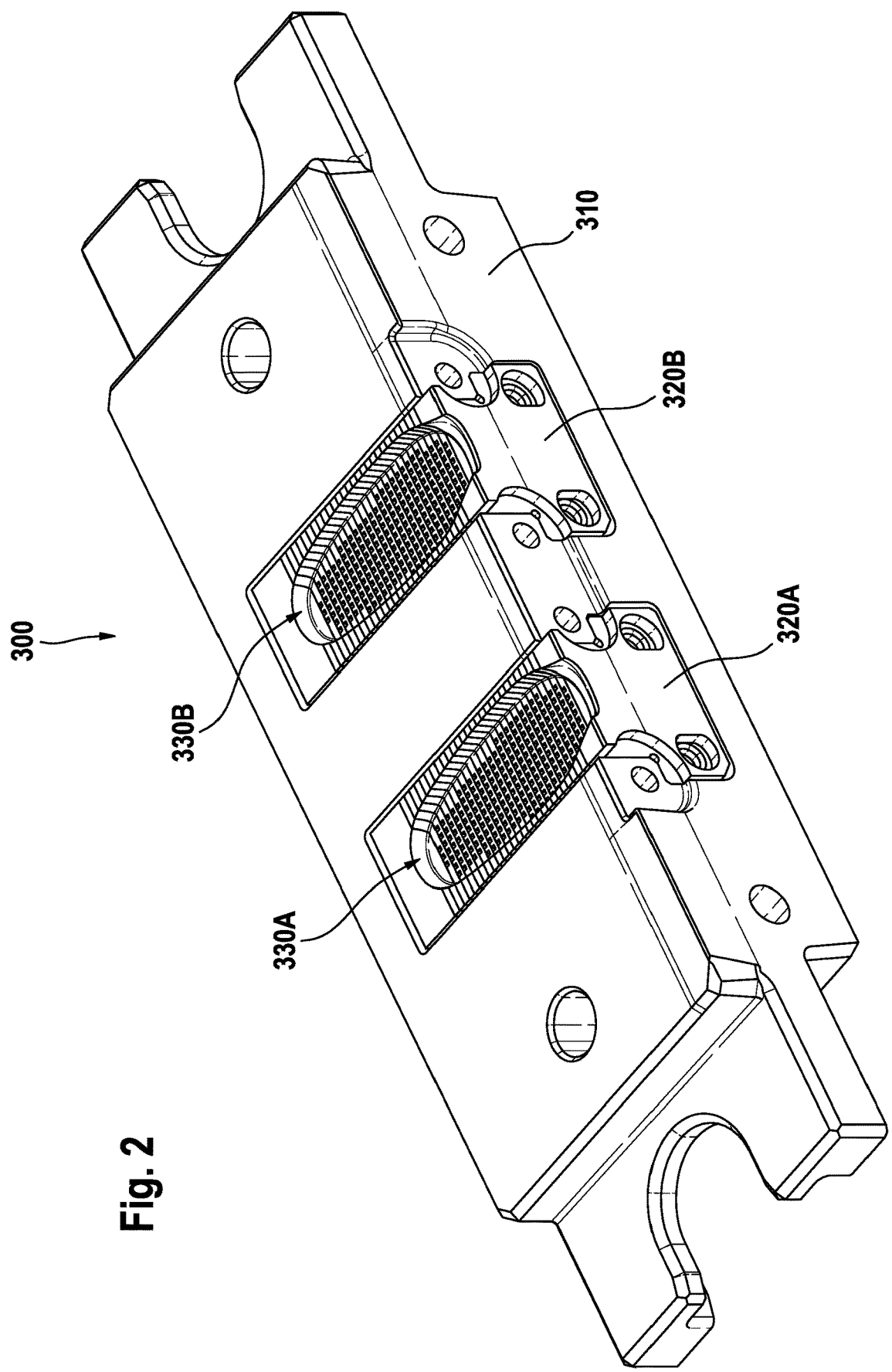
FIG. 2 depiction of a mold bar comprising two mold inserts.

FIG. 2 is a depiction of a moldbar 300 having two inserts 320A and 320B disposed in a frame 310. The moldbar 300 will be inserted into a mold plate of a mold half of an injection molding machine. The shown moldbar 300 is suitable for PIM (plastic injection molding) and ICM (injection compression molding). Each of the inserts 320A and 320B defines a first cavity portion 330A and 330B, respectively, of a unitary brush head, where the first cavity portion 330A, 330B defines filament cavities and at least a portion of the base (or-pre-base) cavity. While in the present case, the moldbar 300 has two inserts 320A, 320B, a moldbar in general may have any other number of inserts such as one insert, three inserts, four inserts, eight inserts, ten inserts etc. While it was here described that the moldbar 300 is inserted into a mold plate of a mold half, more than one moldbar may be inserted into a mold plate, e.g. two moldbars, three moldbars, four moldbars etc. While it is here shown that the inserts 320A and 320B are essentially identical, each of the inserts of a moldbar may be different to the other inserts, i.e. may define a different unitary brush head. In case that several moldbars are inserted into one mold plate, each of the moldbars may be different to the other moldbars (i.e. may have a different number of inserts). Depending on the size of the unitary brush head, a single mold plate may have eight or ten or twelve or 16 or 20 or 24 or 32 or 64 etc. inserts so that in one single injection shot, the respective number of unitary brush heads can be made. For sake of completeness, it shall not be excluded that an insert is directly placed in a mold plate instead of using an additional mold bar. In a set of different moldbars, each moldbar may always have the same outer shape, but the different moldbars may comprise differently sized inserts. Hence, just the moldbar needs to be replaced, but still the same moldplate can be used.

Figure 3:
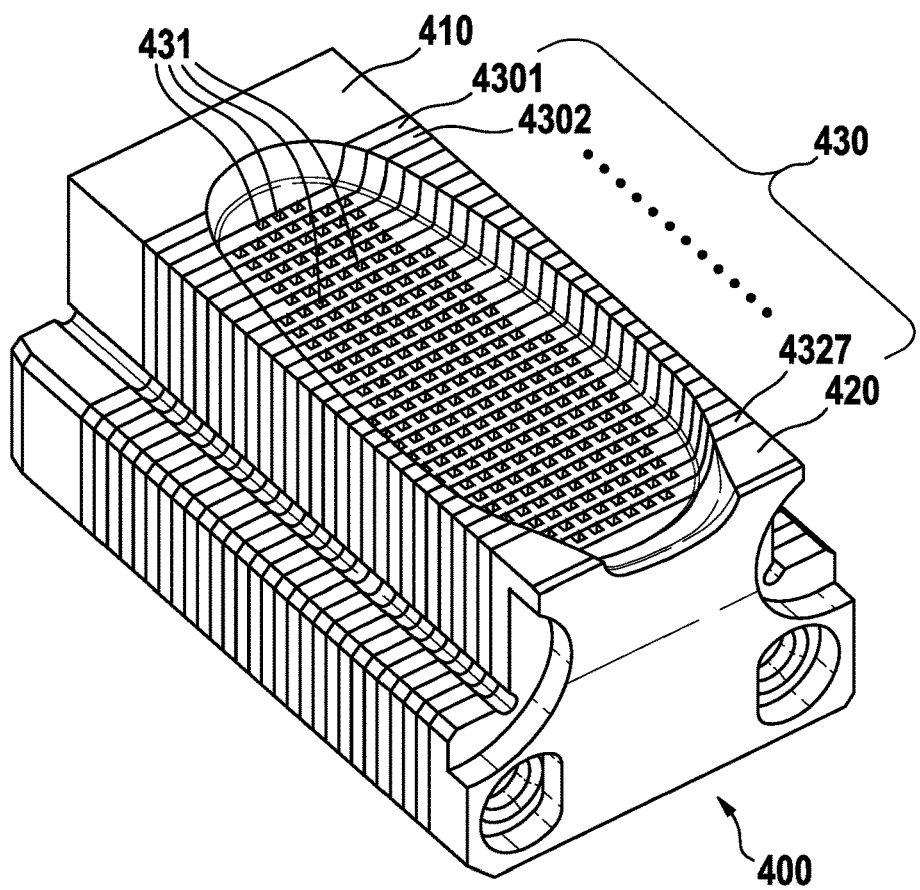
FIG. 3 depiction of an exemplary mold insert assembled from a stack of insert plates.

FIG. 3 is a depiction of an insert 400 as may be inserted into the frame 310 shown in FIG. 2. The insert 400 comprises a vertical stack of insert plates 410, 430, and 420. A plurality of structured insert plates 430 is sandwiched between two end plates 410 and 420. In the shown embodiment, 27 structured insert plates 430 labelled 4301 to 4327 are used to define the filament cavities 431. The thickness of the structured insert plates 430 may be in the range of between 0.7 mm to 2.0 mm. A thickness of about 1.0 mm leads to a distance of the filaments in vertical direction of 1.0 mm, which may be considered a sensible value for a unitary brush head used for tooth brushing. While the structured insert plates 431 are shown here to all have the same thickness in vertical direction, the thickness of the structured insert plates may vary and may in particular vary within the range of between 0.7 mm to 2.0 mm. While the structured insert plates are here shown to all have a first face side that comprises the structures defining the filament cavities and a second face side without any structures, the insert plates in general may include insert plates structured on both face sides and/or may comprise non-structured insert plates, which structured and non-structured insert plates may be alternately arranged, but any other mixture of one-side structured insert plates, two-side structured insert plates, and not structured insert plates may be used. While the end plates 410 and 420 are here shown as unstructured end plates, at least one of the end plates may be structured as well.

Figure 4:
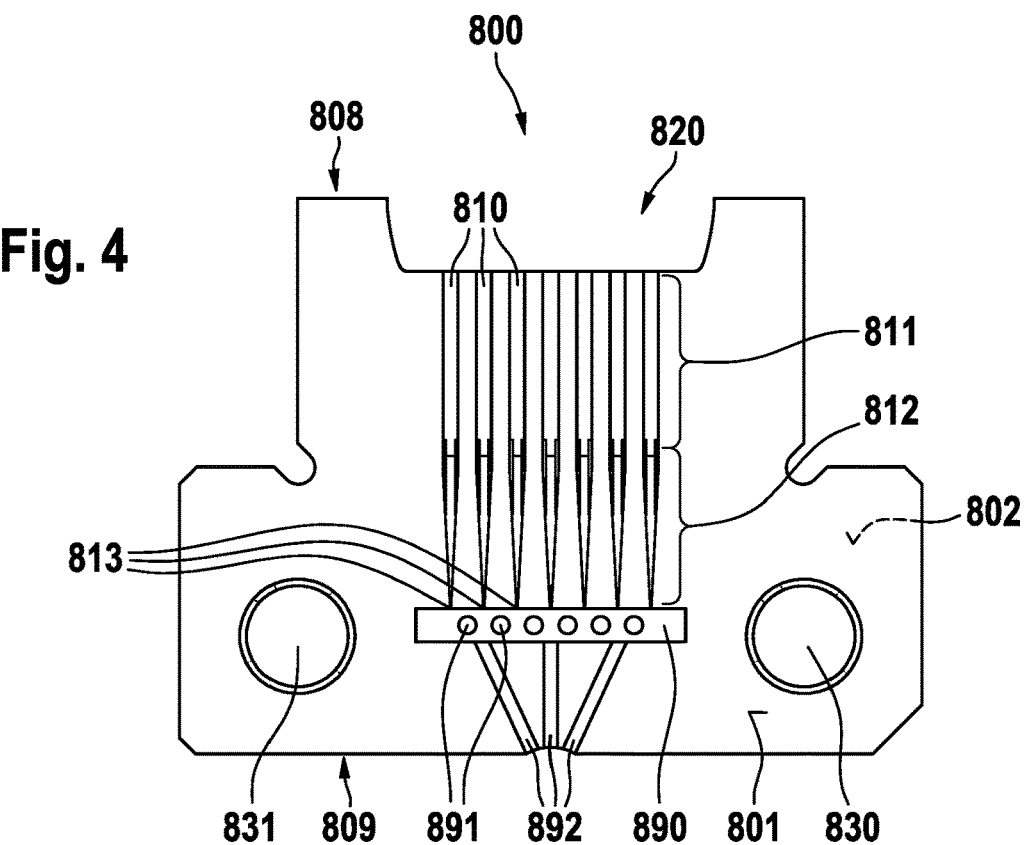
FIG. 4 front view onto a front side of an example insert plate structured of the present description.

FIG. 4 is a front view onto a face side of a structured insert plate 800 as may be used in an insert 400 as shown in FIG. 3 or an insert 320A or 320B shown in FIG. 2. The insert plate 800 has a structured front face side 801 and a further back face side 802 (not visible) that may be structured but may as well be unstructured. The insert plate 800 has a cut-out 820 in its top area 808, which cut-out 820 serves to define a portion of the base (or pre-base) cavity. Further, the insert plate 800 has circular cutouts 830 and 831 that serve to align a plurality of insert plates by means of rod elements that in the assembled state extend through the circular cut-outs 830 and 831, respectively. A plurality of seven partial filament cavities 810 are provided in the front face side 801 of the insert plate 800. In some embodiments, in an assembled state an unstructured face side of another insert plate abuts the structured front face side 801 of the shown insert plate 800 and the partial filament cavities 810 together with the unstructured face side of the other insert plate define the respective filament cavities. In some embodiments, the other insert plate comprises at least one partial filament cavity that coincides in position with one of the partial filament cavities 810 of the shown insert plate 800 and together form a filament cavity. Generally, a structured insert plate has at least one partial filament cavity in one of its face sides (and hence, a non-structured insert plate has just plain face sides). While here a plurality of seven partial filament cavities are shown, any number of partial filament cavities may be provided in a structured face side of an insert plate. Further, while here all partial filament cavities 810 have the same form, at least one of the partial filament cavities may have a form different to the form of the other partial filament cavities, and in particular all of the partial filament cavities may be different to each other.

The shown embodiment indicates that the partial filament cavities 810 are divided into a base portion 811 and a tip portion 812. The length of the base portion 811 and the length of the tip portion 812 may be similar (i.e. the length of the base portion may be 40% or 60% of the total length of the partial filament cavity) or may be even identical. The base portion may have a total de-forming inclination angle (i.e. draft angle) of below 1 degree, whereas the tip portion 812 may taper much faster towards the blind-hole ends 813 of the partial filament cavities. It had been found that such a divided filament cavity structure, where the base portion stays essentially identical and the tip portion is then defining the particular structure of the filament to be made tends to have good filling properties and good deforming properties.

The insert plate 800 further comprises a venting cavity 890 that is provided in the side 801 of the insert plate 800. The venting cavity 890 is in air-conducting connection with each of the blind-hole ends 813 of the partial filament cavities 810. The venting cavity 809 may have a depth in the range of between 2 μm and 10 μm, in particular in a range of between 3 μm and 7 μm, and further in particular of about 5 μm. The venting cavity 890 may in particular be made by laser ablation technology and in particular by application of ultra-short laser pulses. The venting cavity 890 has a very small depth. As the ICM technology is suitable for filling the filament cavities up the very front tip having a diameter in the range of between 40 μm down to about 5 μm, the air-conducting connection to the venting cavity 890 had to be relatively thin (where the thickness may be chosen for a particular filament geometry and material—the thickness of the venting cavity used in the above described experiments was 5 μm). Even under the high pressure applied by the punching tool as described, the molten plastic material will essentially not enter into the venting cavity 809 as the pressure required to fill this small cavity is then too high. Obviously, even such a small connection between the blind-hole ends 813 of the partial filament cavities 10 and the venting cavity 890 is sufficient for de-aeration of the filament cavities in the assembled state. Within the venting cavity 890 several stopper elements 891 are provided, where no material was ablated to form the venting cavity 890. In the assembled state and in use, the insert is held under pressure and the insert plates may tend to deform and to enter into the small venting cavities. This deformation is effectively avoided by providing the stopper elements 891.

As is shown in FIG. 4, the plurality of stopper elements 891 can be arranged in the venting cavity 890 so that each of the stopper elements 891 is positioned intermediate any two mutually adjacent blind-hole ends 813. In the shown embodiment, venting channels 892 connect the venting cavity 890 and the outside of the insert plate 800 at the bottom area 809. The venting channels 892 may be made by any conventional material ablation technology, which causes lower costs than making a laser-ablated venting cavity 890 that extends to the bottom area 809 of the insert plate 800.

Figure 5:
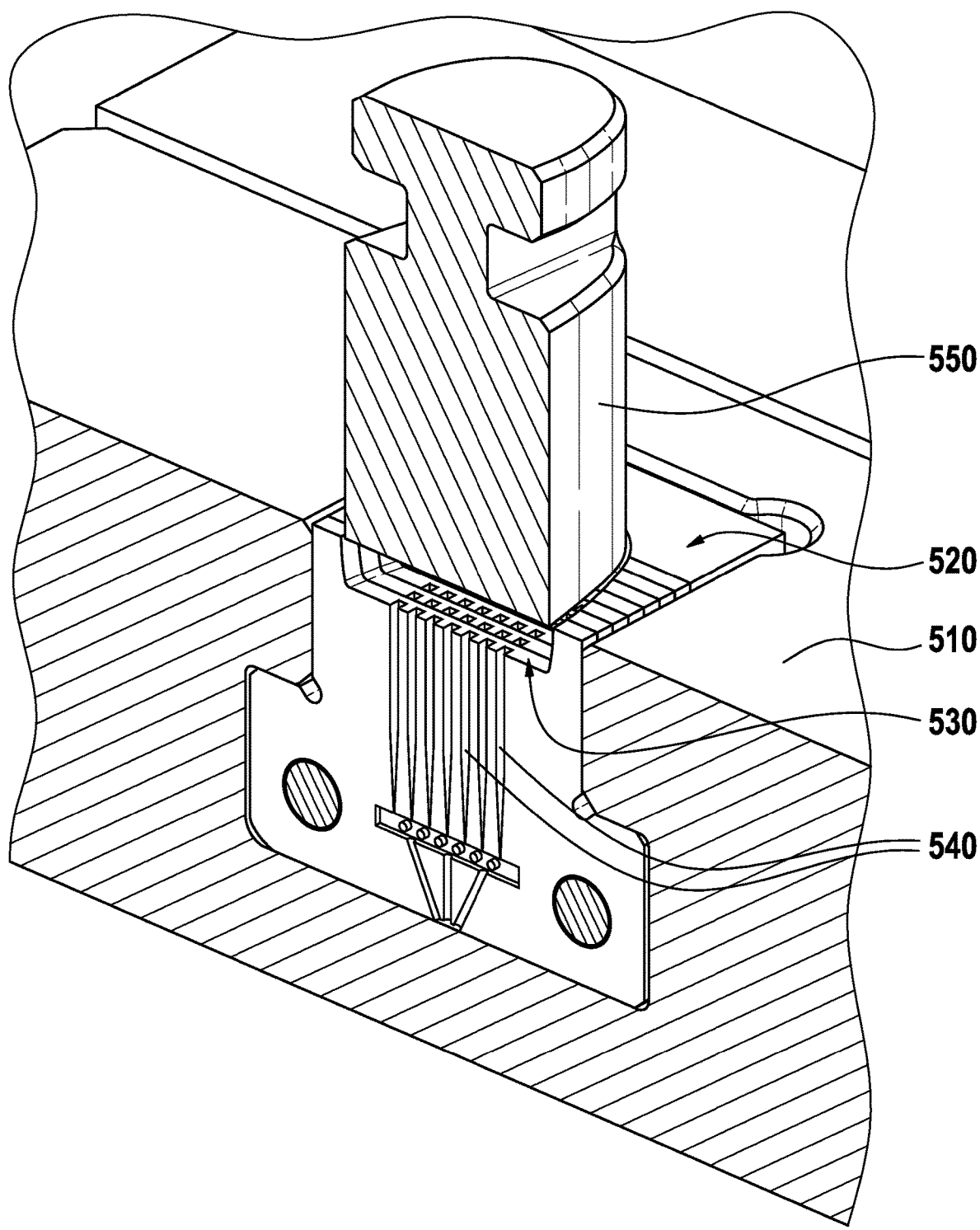
FIG. 5 cross sectional view of a moldbar having a mold insert and of a punching tool in a start position.

FIG. 5 is a cross-sectional depiction of a moldbar 510 with mold insert 520 defining in particular a pre-base cavity 530 and of a punching tool 550 realized as a punching stamp that is arranged for being immersed into the pre-base cavity 530 once it is filled with molten plastic material in order to push the molten plastic into the fine filament cavities 540. In the shown embodiment, the punching tool 550 has essentially the same shape as the pre-base cavity so that the punching tool 550 extends over all filament cavities 540. It is noted that for sake of presentability, the venting cavity at the end of the filament cavities is shown with a dramatically increased depth. As was discussed, the depth of the venting cavity is in the range of a few micrometers.

In some embodiments, the punching tool is realized by one of the mold halves and the mold halves are then moved relatively towards each other to generate the needed pressure that drives the molten plastic into the at least one filament cavity. In some embodiments, the punching tool is an element that can be independently moved with respect to the mold halves as was described.

In some embodiments, the pressure at which the molten plastic material is injected into the mold cavity is chosen such that the at least one filament cavity is essentially not filled, i.e. the injection pressure is chosen so low that the molten plastic material is not pushed into the filament cavities. In other words, if a pressure value P is needed to at least partially fill the filament cavity, then the pressure with which the plastic is injected into the base cavity is chosen such that the pressure in the molten plastic material at the location of the filament cavity is below this pressure P. This assures that the molten plastic material does not already solidify in the thin filament cavities prior to filling the whole filament cavity under the pressure of the punching tool. While the molten plastic may form a thin skin of relatively cool plastic material extending over the filament cavities prior to immersing the punching tool into the pre-base cavity, the high pressure exerted by the punching tool will push the still liquid plastic material through the cooled skin into the filament cavities. Because of the sudden high pressure, the molten plastic material is filling the thin filament cavity up to the small blind-hole end. In some embodiments, the at least one filament cavity has a height in the range of between 3.0 mm and 20.0 mm, in particular of between 8.0 mm and 12.0 mm, and has a blind-hole end diameter in the range of between 5 µm and 40 µm, in particular of between 8 µm and 20 µm.

While here the term "blind-hole end" of the filament cavity is used, this shall not exclude that the filament cavity has a venting structure for guiding air out of the filament cavity. Such a venting structure may in particular have a venting cavity that is in air-conducting connection with the blind-hole end of the filament cavity. The thickness of the venting cavity at least at the location where the venting cavity is in air-conducting connection with the blind-hole end of the filament cavity is in the range of between 2 µm and 10 µm, in particular in the range of between 3 µm and 7 µm, and further in particular of around 5 µm.

As was mentioned before, the herein described method to manufacture a unitary brush head may be used to manufacture unitary brush heads suitable for replacement brushes for electric toothbrushes. In particular, a unitary brush head having a circular or elliptical/oval shape may be made and may then be connected with a drive section comprising a coupling portion. The filaments may be arranged on vertices of a rectangular lattice as was described before or the filaments may be arranged in rings. For the latter arrangement, insert plates may be provided having a circular or elliptical/oval shape (in particular, e.g. two semi-circular insert plates may form together a circular insert plate).

Figure 6A:
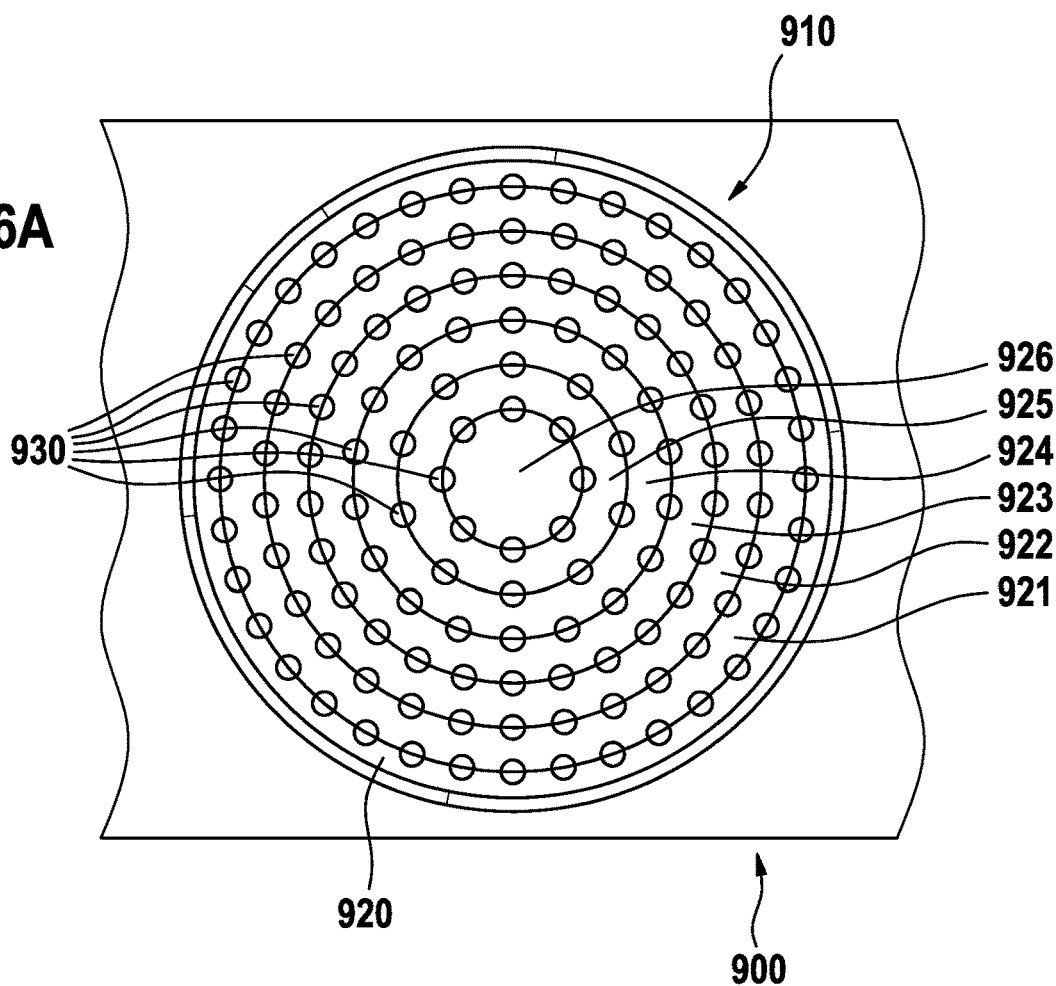
FIG. 6A depiction of a moldbar comprising another embodiment of a mold insert made from stacked insert rings.
Figure 6B:
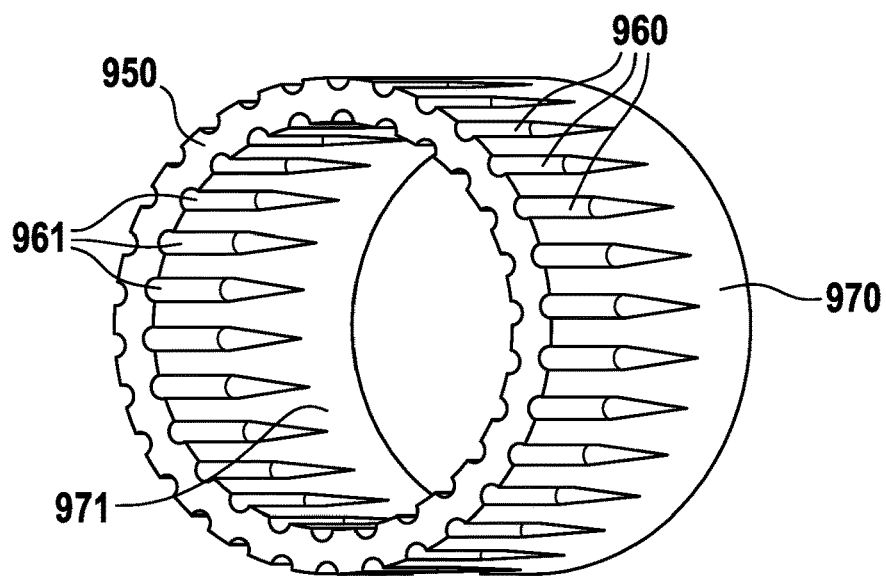
FIG. 6B depiction of a single exemplary insert ring.

FIG. 6A is a top view onto a portion of an example mold bar 900 comprising a mold insert 910 that comprises several essentially ring-like (here: ellipsoidal) insert plates 920, 921, 922, 923, 924, 925, and 926 that form a plurality of filament cavities 930 so that the filaments are finally essentially arranged on rings. FIG. 6B is a perspective view onto a single example insert ring 950 that may be used in a mold insert 910 as shown in FIG. 6A. The insert ring 950 comprises partial filament cavities 960 and 961 formed on the outer face side 970 of the insert ring and on the inner face side 971 of the insert ring 950. As is shown in FIG. 6A, the partial filament cavities 960 and 961 may cooperate with respective partial filament cavities in abutting ring-like insert plates to form the filament cavities for forming a unitary brush head. In the example shown in FIG. 6A, the symmetrically arranged partial filament cavities of the stacked ring-like insert plates automatically align due to the ellipsoidal form of the insert plates. In case of circular insert plates, the insert plates may have at least one cooperating groove and projection pair for aligning the insert plates. Again, while FIGS. 6A and 6B show insert plates having a structured outer and a structured inner side face, in other embodiments, only one of the side faces may be structured to form filament cavities. Essentially the same applies that was above said in connection with the planar insert plates.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mold insert defining at least one filament cavity and comprising a stack of at least a first insert plate and a second insert plate, wherein
   the first insert plate has a top surface, a bottom surface opposite to the top surface, and a front face extending between the top and bottom surfaces, and closely abutting a front face of the second insert plate;
   at least a portion of the at least one filament cavity is provided in at least one of the front faces of the first insert plate and the second insert plate such that the filament cavity is open at a top surface of the mold insert and terminates with a blind-hole at a bottom surface thereof so that the at least one filament cavity does not extend through the bottom surface;
   a venting cavity is provided in the front face of the insert plate in which the portion of the at least one filament cavity is provided, which venting cavity is in air-conducting connection with the blind-hole end of the filament cavity;
   at least one venting channel connecting the venting cavity to an area outside the insert plates; and
   the venting cavity has a depth extending in a direction perpendicular to the front face of the respective first or second insert plate in which the venting cavity is provided, the venting cavity being in air-conducting connection with the blind-hole, wherein the venting cavity comprises at least one stopper element provided to prevent deformation of the insert plates during molding when the insert plates are under pressure.

2. The mold insert of claim 1, wherein several filament cavities are provided in the same front face and the venting cavity is in air-conducting connection with each of the blind-hole ends of the filament cavities.

3. The mold insert of claim 2, wherein the venting cavity is a planar structure having a width of from 500 micrometer to 50 millimeter.

4. The mold insert of claim 1, comprising at least three insert plates, wherein two of the insert plates are a first end plate and a second end plate, each having one front face, and at least one insert plate being a center insert plate having two front faces, and wherein each of these front faces is in close abutment with one of the front faces of the first and second insert end plates.

5. The mold insert of claim 4, wherein the at least one center insert plate has a thickness of from 0.5 mm to 5.0 mm.

6. The mold insert of claim 1, wherein the at least one filament cavity has a diameter of from 0.3 mm to 0.8 mm at the top side of the insert, wherein the filament cavity tapers towards its blind-hole end with a deforming angle of from 0.1 degrees to 1.0 degrees over at least about half the length of the filament cavity.

7. The mold insert of claim 1, wherein at least one of the insert plates has a hollow shape selected from the group consisting of a cylinder-like shape, a frustum-like shape, and a cone-like shape.

8. The mold insert of claim 1, wherein the top surface of the mold insert has a depression defining at least a portion of a base of a unitary brush head having a base and at least one filament that extends from the base.

9. An injection-molding machine comprising the mold insert of claim 1.

10. The injection-molding machine of claim 9, wherein the injection molding machine is arranged to push the first insert plate and second insert plat of the mold insert together with a compression force inhibiting that the first insert plate and second insert plat open under the applied pressure during the injection process.

11. The mold insert of claim 1, wherein the depth of the venting cavity is from 3 μm to 7 μm.

12. The mold insert of claim 11, wherein the depth of the venting cavity is about 5 μm.

13. The mold insert of claim 4, wherein the at least one center insert plate has a thickness of from 0.7 mm to 2.0 mm.

14. The mold insert of claim 6, wherein the at least one filament cavity has a diameter of from 0.4 mm to 0.6 mm at the top side of the insert.

15. The mold insert of claim 1, wherein the at least one stopper element in the venting cavity is positioned intermediate any two of the blind-hole ends that are mutually adjacent.

* * * * *